(12) United States Patent  
Nayebi (10) Patent No.: US 7,715,026 B2
(45) Date of Patent: May 11, 2010

(54) METHOD, APPARATUS, AND SYSTEM FOR NON-CONTACT MANUAL MEASUREMENT OF A WHEEL PROFILE

(76) Inventor: Kambiz Nayebi, 1235 Hightower Trail, Suite 140, Atlanta, GA (US) 30350

( * ) Notice: Subject to any disclaimer, the term of this patent is extended or adjusted under 35 U.S.C. 154(b) by 562 days.

(21) Appl. No.: 11/535,463

(22) Filed: Sep. 26, 2006

(65) Prior Publication Data

US 2008/0074679 A1 Mar. 27, 2008

(51) Int. Cl.
*G01B 11/14* (2006.01)

(52) U.S. Cl. ............... 356/625; 356/630; 356/237.1
(58) Field of Classification Search ............... None
See application file for complete search history.

(56) References Cited

U.S. PATENT DOCUMENTS

| | | | |
|---|---|---|---|
| 4,904,939 A | | 2/1990 | Mian |
| 5,371,581 A | * | 12/1994 | Wangler et al. .......... 356/141.1 |
| 5,636,026 A | | 6/1997 | Mian et al. |
| 5,767,973 A | * | 6/1998 | Naumann .................. 356/602 |
| 6,523,411 B1 | | 2/2003 | Mian et al. |
| 6,768,511 B1 | | 7/2004 | Nakai et al. |
| 6,768,551 B2 | | 7/2004 | Mian et al. |
| 6,909,514 B2 | | 6/2005 | Nayebi |
| 2005/0259273 A1 | | 11/2005 | Mian et al. |

OTHER PUBLICATIONS

Brekke, D.J., Wheel/Rail Profile Studies, Apr. 30-May 2, 1996, Railroad COnference1996, Proceedings of the 1996 ASME/IEEE Joint, pp. 83-90.*
Leedham et al., Wheel/Rail Profile Studies, Apr. 4-6, 1995, Railroad COnference1995, Proceedings of the 1995 ASME/IEEE Joint, pp. 159-162.*

* cited by examiner

*Primary Examiner*—Gregory J Toatley, Jr.
*Assistant Examiner*—Juan D Valentin
(74) *Attorney, Agent, or Firm*—Woodcock Washburn LLP; Barry E. Kaplan (57) ABSTRACT

A method, apparatus and system for non-contact measurement of a railway wheel profile are disclosed herein. To measure the wheel profile, a laser having a distance displacement sensor and angular displacement sensor projects a beam of light onto the surface of a railway wheel to measure the wheel profile. In an alternate embodiment, a rail thickness measurement gauge is provided. In another alternate embodiment, a witness groove measurement gauge is provided.

21 Claims, 5 Drawing Sheets

Fig_1

Fig_2

Fig_3

Fig_4

METHOD, APPARATUS, AND SYSTEM FOR NON-CONTACT MANUAL MEASUREMENT OF A WHEEL PROFILE

BACKGROUND OF THE INVENTION

1. Technical Field

The present invention relates generally to wheel profile measurement, and more specifically, to a method, apparatus, and system for non-contact profile measurement of a train wheel.

2. Description of Related Art

Manual wheel measurement is a well established practice in the railway industry. Over a period of use, a train wheel will experience wear and possibly damage. The metallic structure of train wheels is designed to allow for slow deformation caused by wear or damage over a period of time, thereby reducing the possibility of complete structural failure. To monitor this deformation, the profile of the train wheel is constantly monitored.

Although in certain circumstances a railway wheel profile can be measured while a train is in motion, wheel profiles are also measured in the field or in a repair shop while the train has stopped or while the railway wheel is uninstalled. Proper maintenance, cost savings and derailment prevention are major goals of wheel profile measurement. There are two ways in which the above goals can be accomplished while the train is stopped or while the wheel is uninstalled, contact measurement and non-contact measurement.

Contact measurement means include measuring devices that, when taking measurements, the measuring device must physically touch the railway wheel at the point of measurement. These means include, among others, caliper-based, gauge-based and roller-based measurement devices. Contact means has certain disadvantages and limitations, though. Contact measurement devices are typically inaccurate and difficult to use because of the various points of measurement required to obtain a wheel profile.

Non-contact wheel profile measurement devices include magnetic, eddy current, and laser (or light) measurement methods. Current art magnetic and eddy current measurement methods are limited in that structure differences from wheel to wheel, either through latent defects or defects caused while the railway wheel is in operation, may cause erroneous or inaccurate readings.

Current art non-contact measurement means that use light carry certain limitations as well. For instance, in order to measure multiple wheel data points to construct a profile, current art methods typically require multiple sensors and/or multiple light emitters to measure reflected light. Because of the number of sensors used, these apparatuses are typically bulky, difficult to align, difficult to use, and have power requirements that reduce the usefulness as a hand-held device, if embodied in that manner.

Additionally, current art methods cannot measure certain measurement points that are beyond the visible and measurable viewing area of the lasers and their sensors. As an example, a witness groove of a railway wheel, which is typically located on the outside surface of the railway wheel, is measured to determine the wear on the railway wheel.

Because of its location, on a side of the wheel, the witness groove is not visible or measurable from current art non-contact measurement devices. Further, because the calculation of the wheel diameter uses the witness groove measurement, current art methods are limited in their ability to provide a wheel diameter measurement as well.

Furthermore, because of the multiple lasers and sensors used by current art non-contact measurement devices, a number of points of contact are required to properly locate the device to take accurate measurements. Some devices, in order to obviate the difficulty in placement of the device in a calibrated location, require additional sensors and placement detectors that assist the user in determining when the device is in a calibrated position. This limitation not only increases the complexity of the device, but causes time delays in measuring railway wheels as the user must intricately position the device prior to measurement.

Additionally, because current art non-contact measurement devices are typically a static size that fits over the railway wheel, current are devices do not provide for variability of wheel size. Deviations, whether slight or significant, from a standard railway wheel size may cause measurement errors because of the static size of the measurement device. Significant deviations may cause the device not to be able to fit onto a railway wheel. As such, current art non-contact measurement devices are limited in the size and shape of a railway wheel that the devices may be used on.

Finally, witness groove diameters may vary from manufacturer to manufacturer. Because of the limited variability of current art non-contact measurement devices, the inability to measure the witness groove to determine wheel diameter, and thus wear, further limits the capabilities of the current art.

What is needed is a system, method and apparatus that overcomes the limitations of the prior art, namely, accuracy, portability, ease of use, and provides the user with an ability to measure the witness groove and wheel diameter as well as other measurement points.

BRIEF SUMMARY OF THE INVENTION

Briefly described, in a preferred embodiment, the present invention overcomes the above-mentioned limitations and meets the recognized need by providing a system, method and apparatus for non-contact wheel profile measurement having a hand-held measurement device mounted on a railway train wheel capable of measuring the witness groove and calculating the wheel diameter based upon the witness groove measurement. Further, the present invention is capable of measuring various wheel sizes.

In a preferred embodiment, the measurement device of the present invention comprises a laser rotatably attached to a rotary encoder, preferably an absolute rotary encoder, having a witness groove measurement device removably attached to the railway wheel witness groove. By rotating the laser along a measurement path substantially perpendicular to the wheel circumference, the present invention measures points along the pathway of the laser to generate a wheel profile.

As the user rotates the laser to illuminate the railway wheel, the present invention measures the distance displacement for the laser beam and the angle at which the laser beam is emitted, or the angular displacement. After the laser is rotated to illuminate a planar pathway substantially perpendicular to the wheel circumference, the data is converted from a polar coordinate system to a Cartesian coordinate system to output a wheel profile.

Because the laser beam does not emanate at a point located on the axis of rotation, and rather emanates from the end of a laser unit, to compensate for both the difference in rotation and an inherent change in height caused by the laser rotation, a calibration procedure is used.

For attaching the device to a train wheel, the measurement device includes a series of magnets that allow it to be readily attached and removed along any accessible location along the train wheel. Additionally, to increase the accuracy of the measurements, the device further comes with a series of holder pins that, when placed in communication with the train wheel or some other fixed structure, the placement of either being calibrated, provide for accurate measurements.

A first aspect of an embodiment of the present invention provides a method of measuring a railway wheel with the steps of: placing a laser having angular displacement and distance displacement sensing units in a calibrated location proximate to a railway wheel; energizing said laser to emanate a laser beam; rotating said laser said to cause said laser beam to reflect off a plurality of points substantially perpendicular to the wheel circumference on at least a portion of said railway wheel; capturing angular displacement and distance displacement data of said plurality of points; and calculating a set of wheel parameters based upon said captured distance displacement data and angular displacement data of said plurality of points.

A second aspect of an embodiment of the present invention provides an apparatus for measuring a railway wheel, the apparatus comprising: a means for placing a laser having angular displacement and distance displacement sensing units in a calibrated location proximate to a railway wheel; a means for energizing said laser to emanate a laser beam; a means for rotating said laser said to cause said laser beam to reflect off a plurality of points substantially perpendicular to the wheel circumference on at least a portion of said railway wheel; a means for capturing angular displacement and distance displacement data of said reflected beam from said plurality of points; and a means for calculating a set of wheel parameters based upon said captured distance displacement data and angular displacement data of said plurality of points.

A third aspect of an embodiment of the present invention provides an apparatus for measuring a railway wheel, the apparatus comprising: a laser rotatably attached to a measurement unit, said measurement unit comprising a laser displacement sensor to measure distance displacement data of a beam of said laser and a rotary encoder to measure the angular displacement data of said laser when emitting said beam; and a bracket for mounting said measurement unit on a railway wheel wherein said laser housing is attached to said bracket.

A fourth aspect of an embodiment of the present invention provides an apparatus for measuring a railway wheel witness groove, the apparatus comprising: a laser rotatably attached to a measurement unit, said measurement unit comprising a laser displacement sensor to measure distance data of a beam of said laser and a rotary encoder to measure the angular displacement data of said laser when emitting said beam; a bracket for mounting said measurement unit on a railway wheel wherein said laser housing is attached to said bracket; and a witness groove measurement device, wherein said witness groove measurement device comprises a magnet for removably attaching said witness groove measurement device onto a train wheel, wherein said witness groove measurement device further comprises a surface extending distally from said magnet, wherein said surface is removably engaged with the witness groove, said witness groove measurement device further comprising a shaft of known length extending in a direction substantially parallel to the radius of the railway wheel, wherein said shaft has sufficient length such that a portion of the length of said shaft may be measured by said laser.

A fifth aspect of an embodiment of the present invention provides a method for measuring a railway wheel diameter, with the steps of: placing a laser having angular displacement and distance displacement sensing units in a calibrated location proximate to a railway wheel; energizing said laser to emanate a laser beam; rotating said laser to cause said laser beam to reflect off a plurality of points on a witness groove measurement device and along outer surface of said railway wheel substantially perpendicular to the wheel circumference; capturing angular displacement and distance displacement data of said plurality of points; and calculating the wheel diameter based upon said captured distance displacement data and angular displacement data of said plurality of points.

These and other objects, features, and advantages of the invention will become more apparent to those ordinarily skilled in the art after reading the following Detailed Description of the Invention and Claims in light of the accompanying Figures.

BRIEF DESCRIPTION OF THE DRAWINGS

Accordingly, the present invention will be understood best through consideration of, and reference to, the following Figures, viewed in conjunction with the Detailed Description of the Invention referring thereto, in which like reference numbers throughout the various Figures designate like structure and in which.

DETAILED DESCRIPTION OF THE INVENTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

Figure 1:
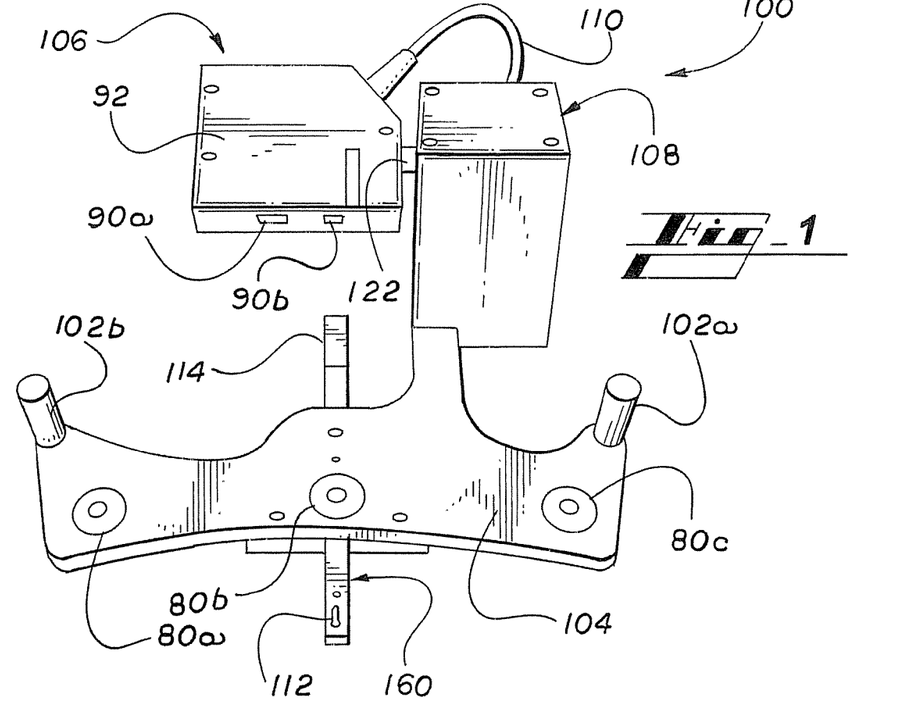
FIG. 1 is a front-side diagram of the apparatus of a preferred embodiment of the present invention.
Figure 4:
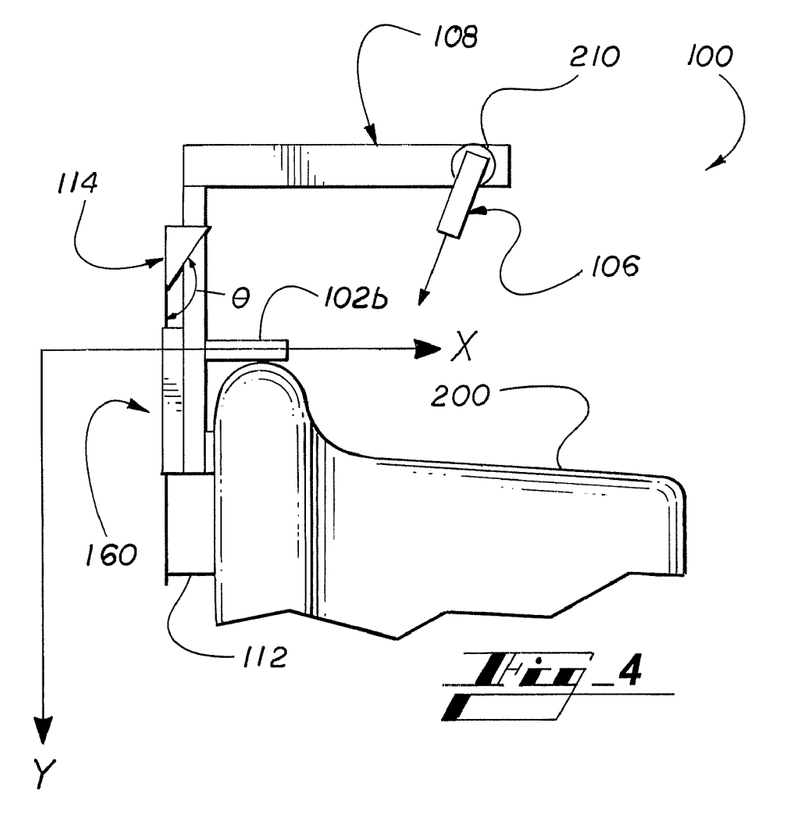
FIG. 4 shows the apparatus of FIG. 1 mounted on a railway wheel.

In that form of the preferred embodiment of the present invention chosen for purposes of illustration, FIG. 1 shows apparatus 100 used to measure points along a wheel surface to determine the wheel profile. In a preferred embodiment of the present invention, apparatus 100 is removably mounted to a railway wheel (as shown in FIG. 4) by placing mounting bracket 104 against the outer rim of the outside of the wheel (as shown in FIG. 4). The user then manipulates apparatus 100 until pins 102a,b are in communication with the top edge of the wheel's flange (as shown in FIG. 4). Magnets 80a-c magnetically hold apparatus 100 onto the railway wheel.

Although the preferred embodiment of the present invention is described in a manner such that the present invention is mounted directly on the railway wheel, it is anticipated and considered to be within the scope of the present invention to use other mounting methods. For illustrative purposes only, a stand may be placed in proximity to the railway wheel and calibrated so that the present invention may be operated according to embodiments described herein.

To measure the wheel profile, once apparatus 100 is magnetically mounted to the wheel, the user will energize laser unit 106, the unit having laser housing 92. Housing 92 has aperture 90b through which the beam of laser 106 will emanate. Further, aperture 90a allows the beams of laser 106 which are reflected off the surface of the wheel to be received by a sensing unit inside laser unit 106 to measure the distance displacement of the laser beam. Electronic housing unit 108 is in communication with the distance displace sensing unit through communication wire 110. Distance displacement data is send via wire 110 to a data receiving computer unit disposed in electronic housing unit 108.

Laser unit 106 is rotatably mounted to electronic housing unit 108 through shaft 122. As laser unit 106 is rotated, thus rotating shaft 122, a rotary encoder located inside electronic housing unit 108 detects and measures the angular displacement of laser unit 106, shown in more detail in FIG. 4. Angular displacement data and distance displacement data are stored in the computer unit in electronic housing unit 108 and are communicated to an external computational unit (not shown) to convert the collected data, which is in a polar coordinate system format, to a Cartesian coordinate system format.

In an alternate embodiment of the present invention, apparatus 100 may also have a rim index measurement device 160 having rim index pin 112 and measurement surface 114, shown in greater detail in FIGS. 7 and 9, and described more fully below with reference thereto.

Figure 2:
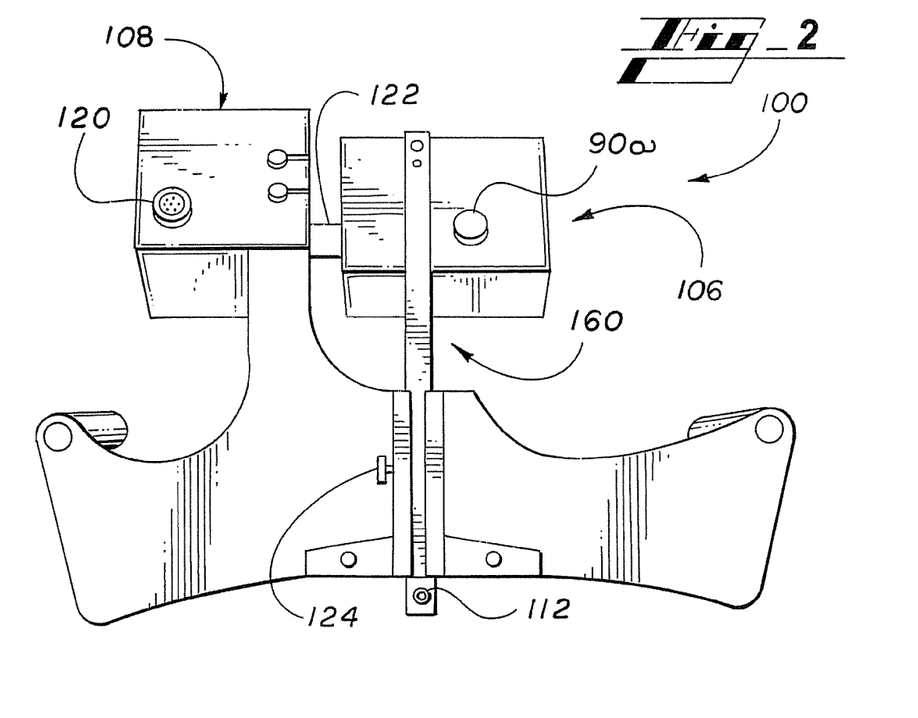
FIG. 2 is a back-side diagram of the apparatus of FIG. 1.

FIG. 2 shows the back-side of apparatus 100. As shown, laser unit 106 has apertures 90a and 90b, laser unit 106 being rotatably mounted to electronic housing unit 108 through shaft 122. The collected angular displacement and distance displacement data is communicated to an external computation unit (not shown) via communication port 120. The external computational unit may include, but are not limited to, personal data assistants and personal computers. Laser unit 106 emits a laser beam through aperture 90b. Distance displacement sensors (not shown) sense the reflected laser beams of laser unit 106 through aperture 90a. Additionally, rim index measurement device 160 is shown in more detail.

Figure 9:
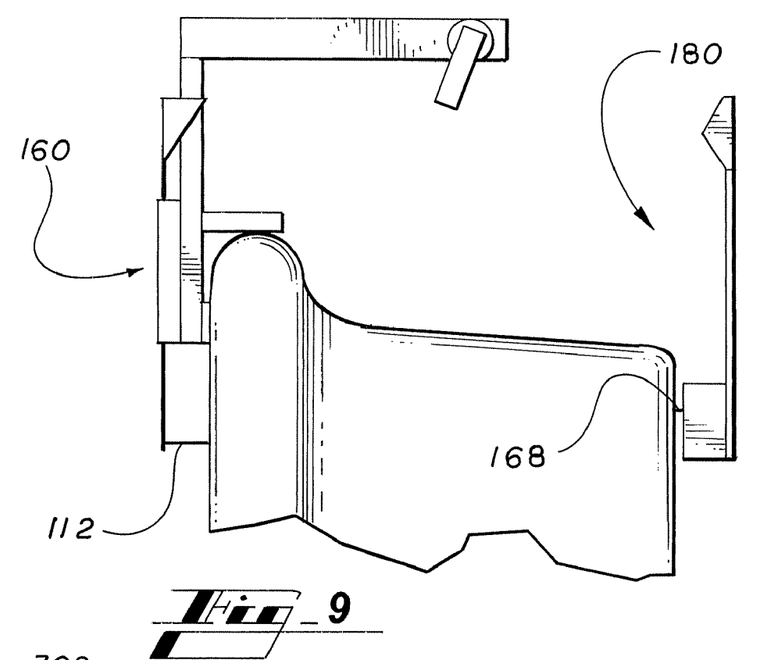
FIG. 9 shows both the rim index and the witness groove index measurement devices installed on the apparatus of FIG. 1.

The user manipulates rim index measurement device 160 up or down until pin 112 is engaged with the rim corner of the railway wheel, as shown in FIG. 9. Once engaged, tightening screw 124 prevents further movement of rim index measurement device 160, allowing the user to commence measurement of the wheel. It should be understood and appreciated by those of ordinary skill in the art that tightening screw 124 is used for illustrative purposes, and that any means of securing rim index measurement device 160 has been contemplated and is considered to be within the scope of the present invention.

Figure 3:
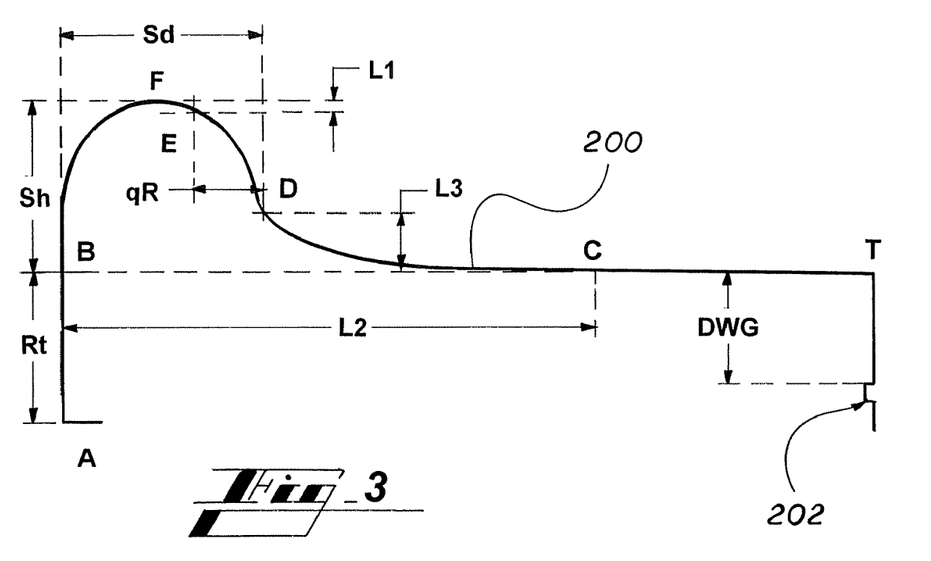
FIG. 3 shows an illustrative set of measurements for a railway wheel.

FIG. 3 shows an illustrative set of measurements that may be desired for a railway wheel. More specifically, profile 210 is determined by measuring the wheel using apparatus 100. The measurements include: rim tape line C and point A which is the end of the rim corner; flange height Sh, which comprises a vertical distance between tape line C and flange top point F; flange thickness Sd, which comprises a horizontal distance between point D, which is typically 10 mm above tape line C, and flange wall line AB; flange slope qR, which comprises a horizontal distance between points E and D; tread hollow Hd, which comprises the depth of the valley of the railway wheel tread area, if it exists; witness groove reading DWG, which comprises the vertical distance between tapeline T and the top of witness groove 202; and wheel diameter Dm, which preferably comprises witness groove reading DWG and the known diameter of witness groove 202.

FIG. 4 shows a side view of apparatus 100 mounted on railway wheel 200. As shown, laser unit 106 is rotatably mounted on electronic housing unit 108. Rotary encoder 210 measures the angular displacement of laser unit 106 as it is rotated. Pin 102b and 102a (not shown) facilitate the mounting of apparatus 100 onto railway wheel 200 into a calibrated position. The calibration of apparatus 100 is described in more detail in FIG. 10 below.

FIG. 4 also shows rim index measurement device 160. As described above in FIG. 3, according to an alternate embodiment of the present invention, to measure the rim thickness of wheel 200, the user manipulates rim index measurement device 160 until pin 112 is engaged with wheel 200 at point A. The user rotates laser unit 106 past the surface of wheel 200 and measures measurement surface 114 of rim index measurement device 160. Because surface 114 is of a known length, as shown in further detail in FIG. 7, the rim thickness can be calculated based upon the height of rim index measurement device 160 measurement surface 114.

Apparatus 100 measures the distance displace of the laser beam emanating from laser unit 106 after being reflected by wheel surface 200 and the angular displacement of laser unit 106. Illustrative measurements are shown more fully in FIG. 5. The illustrative measurements in FIG. 5 reflect the distance displacement of the laser beam along the horizontal axis, the angular displacement of laser unit 106 at the measured distance along the vertical axis, a radial offset, $R_o$, which is the apparent change in height caused by the laser beam location off the axis of rotation, and an angular offset, $\Theta_o$, the offsets determined by the calibration process, as more fully described with reference to FIG. 10 below.

Figure 5:
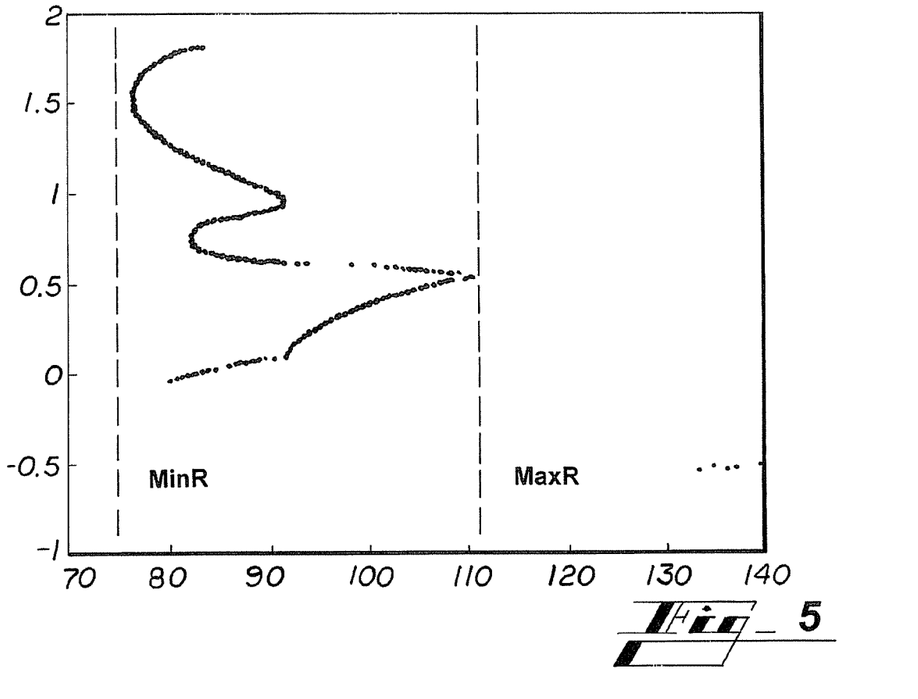
FIG. 5 shows measured data using the apparatus of FIG. 1.
Figure 6:
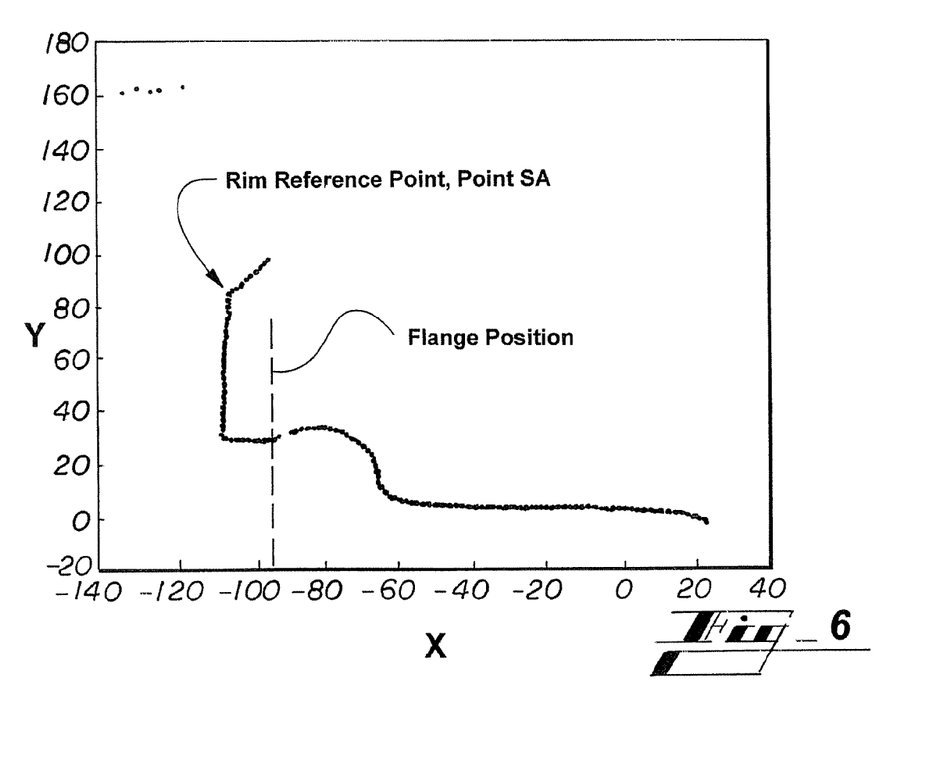
FIG. 6 shows the measured data of FIG. 5 converted to a Cartesian coordinate apparatus.

Upon completion of a scan, the illustrative measurements of FIG. 5 are converted from a polar coordinate system to a Cartesian coordinate system, compensated by calibration parameters $R_o$ and $\Theta_o$ as shown in FIG. 6. As shown, measured points are represented both in vertical displacement by the Y-axis and horizontal displacement by the X-axis. The illustrative measurements show a wheel profile. Shown further are certain points used in an alternative embodiment of the present invention, namely point SA, which is the rim reference point used to determine the rim thickness.

Because the present invention is rotated around a single axis, some wheel profile measurement points may not be visible to laser unit 106. For instance, the rim thickness is measured using two points that are blocked, or are not open to scanning, by the wheel flange, as shown and described more fully with reference to FIG. 9 below. To measure the rim thickness, in an alternate embodiment of the present invention, a rim index measurement device is used to present a detectable and measurable surface to laser unit 106, the surface proportional to the rim thickness.

Figure 7:
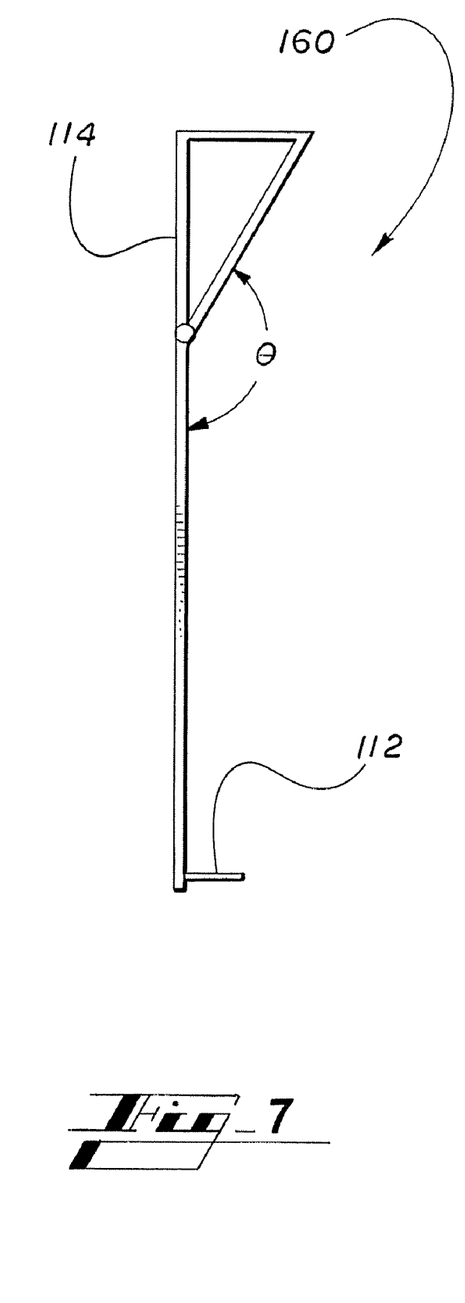
FIG. 7 is a rim index measurement device used in an alternate embodiment of the apparatus of FIG. 1.

FIG. 7 more fully illustrates the rim index measurement device 168 that provides a detectable and measurable surface to calculate a railway wheel's rim thickness. A user manipulates rim index measurement device 160 until pin 112 engages with the railway wheel rim corner (best seen with reference to FIG. 9). When laser unit 106 detects and captures the visible and measurable length of rim index measurement device 160, the length of rim index measurement device 160 measured to angle θ provides a means to measure the rim thickness, as shown more fully in FIG. 9 below.

Figure 8:
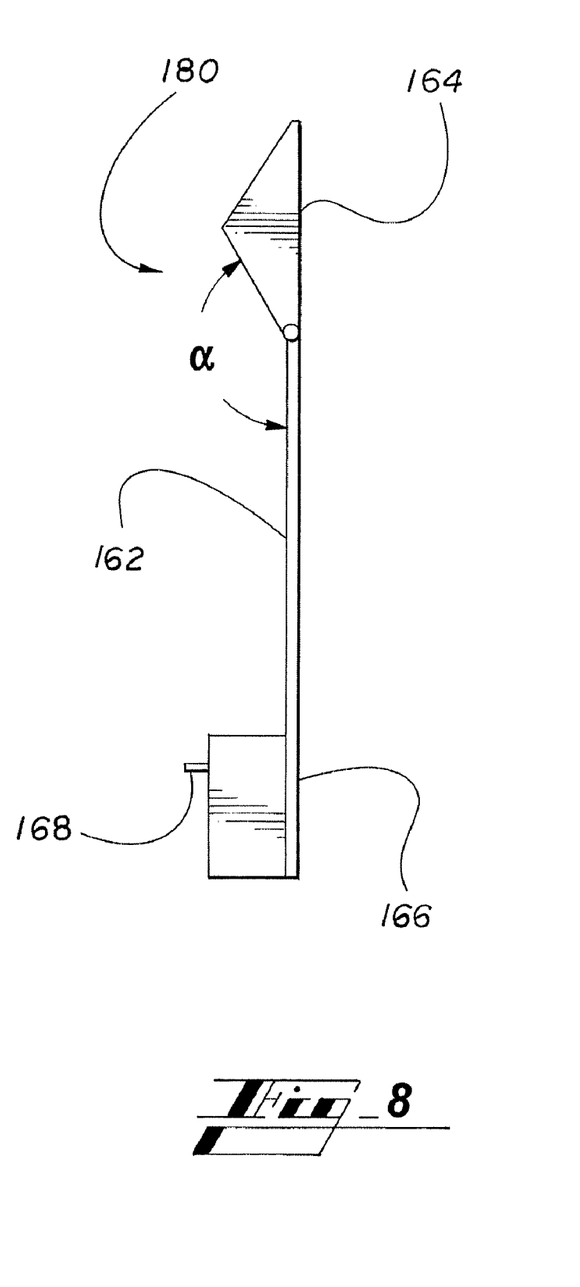
FIG. 8 is the witness groove index measurement device of the apparatus of FIG. 1.

FIG. 8 shows witness groove measurement device 180 as used in a preferred embodiment of the present invention. More fully, witness groove measurement device 180 has shaft 162 of known length, pin 168 which sits in the witness groove of the railway wheel, angle α, a known angle, and upper angular surface 164. To hold witness groove measurement device 180 onto the railway wheel, affixed magnet 166 is provided. As laser unit 106 is rotated and measures the measurable length of shaft 162 to angle α, based upon the difference between the known length of shaft 162 to angle α, the witness groove profile can be measured. Both angle α and upper angular surface 168 are used to calculate witness groove measurement DWG, as depending upon the size and diameter of the railway wheel, all or part of angle α may not be visible and measurable by laser unit 106, as well as a portion of upper angular surface 164 in railway wheels having a witness groove diameter significantly smaller than the railway wheel diameter.

The placement of rim index measurement device 160 and witness groove measurement device 180 are shown more fully in FIG. 9. Rim index measurement device 160 pin 112 is manipulated until pin 112 rests on the outer circumference of rim corner A of railway wheel 200. Further, witness groove measurement device 180 pin 168 is disposed within witness groove 220 of wheel 200. As laser unit 106 is rotated, the lengths of rim index measurement device 160 and witness groove measurement device 180 visible to laser unit 106 are measured and converted, using the calibration parameters $R_o$ and $\Theta_o$ to measure the rim thickness and witness groove reading DWG.

Figure 10:
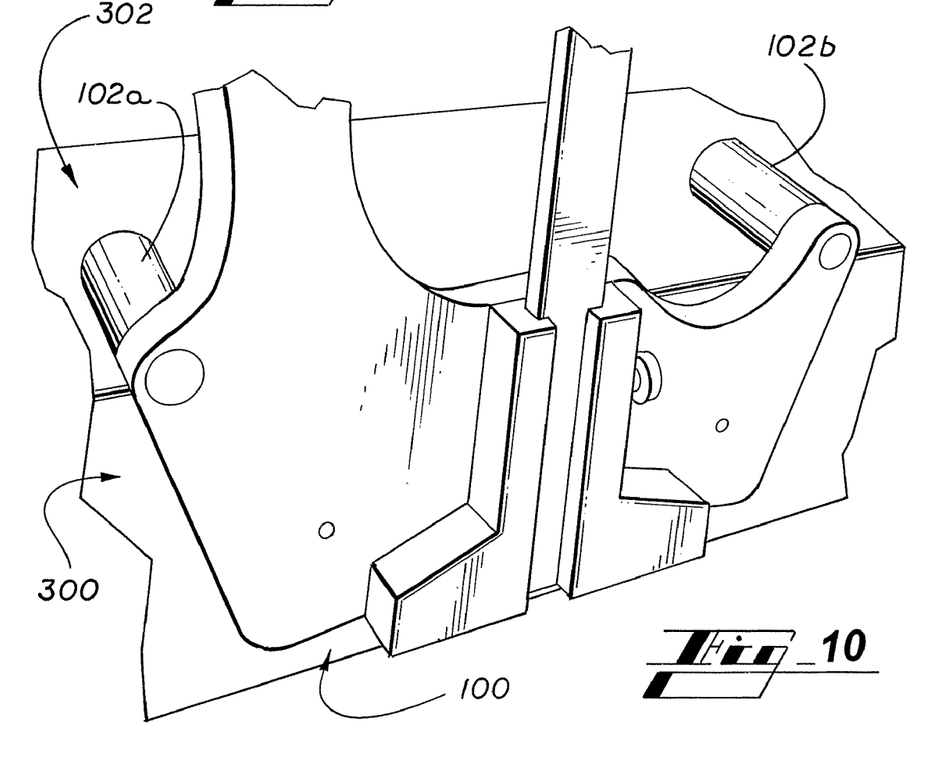
FIG. 10 shows the calibration apparatus for the apparatus of FIG. 1.

To determine and compensate for calibration parameters $R_o$ and $\Theta_o$ apparatus 100 is calibrated using calibration stand 300, as shown in FIG. 10. Described more fully in reference to FIG. 10, calibration stand 300 has flat surface 302 upon which apparatus 100 is placed, the positioning of which is set at a calibrated position using pins 102a,b. To calibrate apparatus 100, the user scans surface 302 and a calibration unit determines calibration parameters $R_o$ and $\Theta_o$. Once calibration parameters $R_o$ and $\Theta_o$ have been determined for the placement of apparatus 100 upon a railway wheel with pins 102a,b touching the railway wheel, when apparatus 100 is subsequently placed upon a railway wheel to measure the wheel profile, if pins 102a,b are touching the railway wheel, apparatus 100 is in a calibrated position.

Having, thus, described exemplary embodiments of the present invention, it should be noted by those skilled in the art that the within disclosures are exemplary only and that various other alternatives, adaptations, and modifications may be made within the scope and spirit of the present invention. Accordingly, the present invention is not limited to the specific embodiments as illustrated herein, but is only limited by the following claims.

The invention claimed is:

1. A method for measuring the profile for a railway wheel, said method comprising:
   placing one laser having an angular displacement sensing unit and distance displacement sensing unit in a calibrated location proximate to a railway wheel;
   energizing said laser to emanate a laser beam;
   rotating said laser to cause said laser beam to reflect off a plurality of locations on at least a portion of said railway wheel;
   capturing angular displacement and distance displacement data of said plurality of locations; and
   calculating a set of wheel parameters based upon said captured distance displacement data and angular displacement data of said reflected beam from said plurality of locations.

2. The method of claim 1, wherein said set of wheel parameters comprise flange height, flange thickness, flange, slope, tread hollow, rim thickness, wheel diameter, and witness groove reading.

3. An apparatus for optically measuring the profile for a railway wheel, said apparatus comprising:
   a means for placing one laser having angular displacement and distance displacement sensing units in a calibrated location proximate to a railway wheel;
   a means for energizing said laser to emanate a laser beam;
   a means for rotating said laser said to cause said laser beam to reflect off a plurality of points on at least a portion of said railway wheel;
   a means for capturing angular displacement and distance displacement data of said plurality of points; and
   a means for calculating a set of wheel parameters based upon said captured distance displacement data and angular displacement data of said reflected beam from said plurality of points.

4. An apparatus for measuring a railway wheel witness groove, said apparatus comprising:
   a laser rotatably attached to a measurement unit, said measurement unit comprising a laser displacement sensor to measure distance data of a beam of said laser and a rotary encoder to measure the angular displacement data of said laser when emitting said beam; and
   a bracket for mounting said measurement unit on a railway wheel.

5. The apparatus of claim 4, further comprising holder pins to facilitate mounting of said bracket on said railway wheel at a calibrated position.

6. The apparatus of claim 4, further comprising a calculation unit in communication with said measurement unit, wherein said calculation unit comprises a communication unit for receiving distance data and angular displacement data from said measurement unit.

7. The apparatus of claim 6, wherein said calculation unit further comprises a microprocessor unit for converting said distance data and said angular displacement data into a Cartesian coordinates.

8. The apparatus of claim 6, wherein said calculation unit further comprises an LCD display for displaying said distance data, angular displacement data, and Cartesian coordinate data.

9. The apparatus of claim 6, wherein said calculation unit further comprises a memory storage unit for storing said distance data, angular displacement data, and Cartesian coordinate data.

10. The apparatus of claim 4 further comprising a witness groove measurement device comprising a shaft of known length extending in a direction substantially parallel to the radius of the railway wheel, and means for removably engaging the witness groove measurement device with the witness groove of the railway wheel.

11. The apparatus of claim 4 further comprising a rim index measurement device comprising a shaft of known length extending in a direction substantially parallel to the radius of the railway wheel, and means for aligning the rim index measurement device with the railway wheel rim corner.

12. The apparatus of claim 11 wherein the shaft of the rim index measurement device has sufficient length such that a portion of the shaft extends beyond the flange of the railway wheel and may be measured by the laser.

13. A system for optically measuring the profile for a railway wheel, said system comprising:
   one laser having an angular displacement sensing unit and distance displacement sensing unit, said distance displacement sensing unit providing the distance measurement of a laser beam travel emanating from said laser and said angular displacement sensing unit providing angular displacement measurement of said laser;

a mounting device for mounting said laser onto a railway wheel at a calibrated position, said laser rotatably mounted onto said mounting device;

a computational unit in communication with said distance displacement sensing unit and said angular displacement sensing unit for receiving said distance measurement and said angular displacement measurement.

14. The system of claim 12, wherein said computational unit further comprises a processor for converting said distance measurement and said angular displacement measurement into Cartesian coordinates.

15. The system of claim 14, wherein said computational unit further comprises an output processor wherein said output processor displays said converted said distance measurement and said angular displacement measurement to a user.

16. The system of claim 14, wherein said computational unit further comprises a memory storage unit for storing measured angular displacement measurement, distance displacement measurement, and converted angular displacement measurement and distance displacement measurement.

17. The computational unit of claim 12 wherein said computational unit is a handheld personal digital assistant.

18. A method for measuring a railway wheel diameter, said method comprising the steps of:

placing a laser having angular displacement and distance displacement sensing units in a calibrated location proximate to a railway wheel;

energizing said laser to emanate a laser beam;

rotating said laser to cause said laser beam to reflect off a plurality of points on a witness groove measurement device and along the outer surface of said railway wheel substantially perpendicular to the wheel circumference;

capturing angular displacement and distance displacement data of said plurality of points; and calculating the wheel diameter based upon said captured distance displacement data and angular displacement data of said plurality of points.

19. An apparatus for measuring a railway wheel witness groove, said apparatus comprising:

a laser rotatably attached to a measurement unit, said measurement unit comprising a laser displacement sensor to measure distance data of a beam of said laser and a rotary encoder to measure the angular displacement data of said laser when emitting said beam;

a bracket for mounting said measurement unit on a railway wheel; and and a witness groove measurement device, wherein said witness groove measurement device comprises a magnet for removably attaching said witness groove measurement device onto a train wheel witness groove.

20. The apparatus of claim 19, wherein said witness groove measurement device further comprises a surface extending distally from said magnet, wherein said surface is removably engaged with the witness groove.

21. The apparatus of claim 19, wherein said witness groove measurement device further comprising a shaft of known length extending in a direction substantially parallel to the radius of the railway wheel, wherein said shaft has sufficient length such that a portion of the length of said shaft may be measured by said laser.

* * * * *